(12) United States Patent
Fries

(10) Patent No.: US 7,113,104 B2
(45) Date of Patent: Sep. 26, 2006

(54) GIANT MAGNETORESISTANCE BASED GYROSCOPE

(75) Inventor: David P. Fries, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 373 days.

(21) Appl. No.: 10/650,867

(22) Filed: Aug. 28, 2003

(65) Prior Publication Data

US 2006/0055551 A1   Mar. 16, 2006

Related U.S. Application Data

(63) Continuation-in-part of application No. 09/715,339, filed on Nov. 17, 2000, now Pat. No. 6,633,233.

(51) Int. Cl.
   *G08D 21/00* (2006.01)
(52) U.S. Cl. ............... 340/672; 340/665; 340/683; 340/674; 324/173; 324/179; 360/313
(58) Field of Classification Search ........... 340/672, 340/665, 666, 674, 683, 689, 669, 657, 815.71; 360/313; 324/173, 179
   See application file for complete search history.

(56) References Cited

U.S. PATENT DOCUMENTS

| | | | |
|---|---|---|---|
| 3,739,158 A | 6/1973 | Woodward ............ 318/635 |
| 3,899,779 A | 8/1975 | Malozenmoff ............ 365/2 |
| 3,996,571 A | 12/1976 | Chang ............ 365/3 |
| 4,031,526 A | 6/1977 | Archer et al. ............ 365/8 |
| 4,246,474 A | 1/1981 | Lazzari ............ 235/450 |
| 4,326,188 A | 4/1982 | Dahlberg ............ 338/325 |
| 4,510,802 A | 4/1985 | Peters ............ 73/505 |
| 4,629,982 A | 12/1986 | Kieslich ............ 340/672 |
| 4,864,288 A | 9/1989 | Cross ............ 340/669 |
| 5,600,064 A | 2/1997 | Ward ............ 73/504.04 |
| 5,675,459 A | 10/1997 | Sato et al. ............ 360/325 |
| 5,729,137 A | 3/1998 | Daughton et al. ............ 324/252 |
| 5,731,937 A * | 3/1998 | Yuan ............ 360/322 |
| 5,825,593 A * | 10/1998 | Mowry ............ 360/322 |
| 5,936,801 A * | 8/1999 | Boutaghou et al. ........ 360/234.7 |
| 6,111,716 A | 8/2000 | Ngo et al. ............ 360/67 |
| 6,550,329 B1 * | 4/2003 | Watson ............ 73/504.13 |
| 6,633,233 B1 * | 10/2003 | Fries ............ 340/669 |
| 6,845,667 B1 * | 1/2005 | Watson ............ 73/504.12 |
| 6,940,277 B1 | 9/2005 | Fries | |

OTHER PUBLICATIONS

Publication entitled "IMI Gyroscope Closeup" dated Dec. 18, 2000 at http://www.imi-mems.com/closegyro.htm Giant Magneto-Resistance Devices, authored by E. Hirota, H. Sakakima and K. Inomata, and published by Springer Series In Surface Sciences. (Book cover title page, preface, table of contents and Section 4.3.1 (pp. 100-105).

* cited by examiner

*Primary Examiner*—Thomas Mullen
*Assistant Examiner*—Daniel Previl
(74) *Attorney, Agent, or Firm*—Howard & Howard Attnys.

(57) ABSTRACT

A gyroscope (10) for determining rate of rotation includes a giant magnetoresistor (GMR) (14) attached to a mass (12) oscillating along a first axis. When the gyroscope (10) is rotated, the mass (12) also oscillates along a second axis perpendicular to the first axis. A magnetic element (16), which includes of a strip of magnetic bits (18), is disposed along the first axis, the second axis, or both. The magnetic bits (18) supply discrete magnetic fields. The GMR (14) changes in electrical resistance when exposed to these magnetic fields. A voltage sensor (20) and processor (34) are then utilized to calculate the rate of rotation.

12 Claims, 3 Drawing Sheets

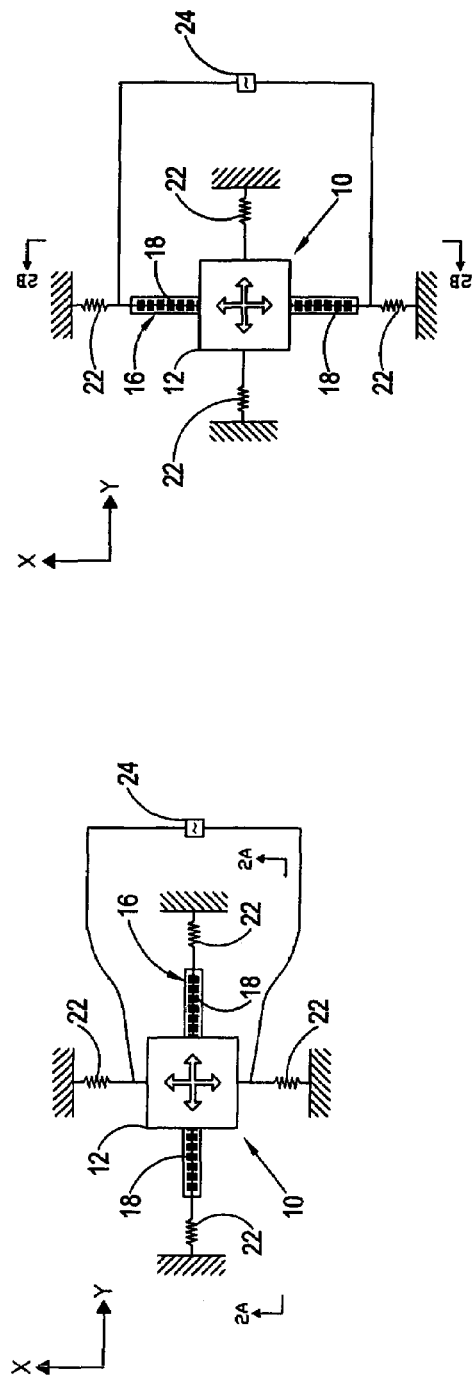
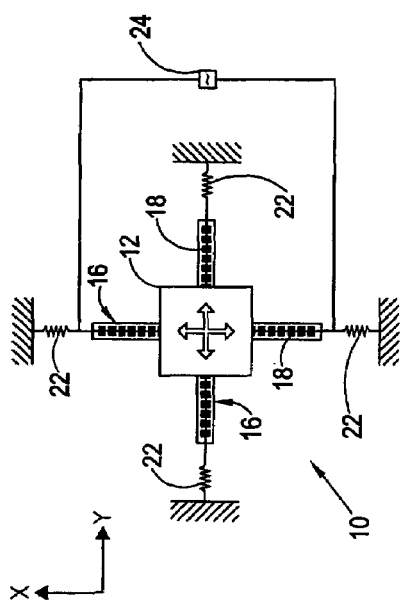
Fig. 1A
Fig. 1B
Fig. 1C

GIANT MAGNETORESISTANCE BASED GYROSCOPE

CROSS-REFERENCES TO RELATED APPLICATIONS

The subject patent application is a continuation-in-part of U.S. patent application Ser. No. 09/715,339, filed Nov. 17, 2000, now U.S. Pat. No. 6,633,233, issued Oct. 14, 2003.

BACKGROUND OF THE INVENTION

1. Field of the Invention

The subject invention relates to a gyroscope for determining rate of rotation using giant magnetoresistance technology.

2. Description of the Related Art

Gyroscopes are well known in the art. The classical gyroscope utilizes a mass that spins steadily about a free movable axis, also known as a gimbal. When the gyroscope is tilted, the gyroscopic effect causes the gimbal to move orthogonally to the direction tilted, allowing a user to determine an angle moved.

Most modern gyroscopes, however, determine rate of rotation utilizing an element which oscillates along an axis. When the gyroscope is rotated, the Coriolis effect causes a secondary vibration orthogonal to the original oscillation. Typically, a capacitive sensor is used to detect this secondary vibration. The signal produced by the capacitive sensor is analog and typically must be converted to a digital signal by an analog-to-digital converter. A computing device, such as a processor, can then receive the digital signal and determine the rate of rotation.

BRIEF SUMMARY OF THE INVENTION AND ADVANTAGES

The invention provides a gyroscope for determining a rate of roation. The gyroscope includes a magnetic element which produces a magnetic field. The gyroscope also includes a mass that oscillates back and forth along an axis and a giant magnetoresistor (GMR) connected to the mass. The oscillations of the mass vary as the gyroscope (10) is rotated. The GMR changes in electrical resistance in response to changes in the magnetic field produced by the magnetic element. A voltage sensor is operatively connected to the GMR to sense a voltage across the GMR. The magnetic element includes a strip of magnetic bits to provide discrete magnetic regions disposed linearly relative to one another along a path. The mass and the strip of magnetic bits are supported for movement relative to one another along the path. The voltage sensor produces digital signals as the mass moves along the path.

Since the voltage sensor produces digital signals, as opposed to analog signals, additional circuits are not necessary to perform an analog-to-digital conversion. The voltage sensor may be interfaced directly with a computing device, such as a processor, to compute the rate of rotation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a top view of a first embodiment of a giant magnetoresistance based gyroscope according to the subject invention;

FIG. 1B is a top view of a second embodiment of the giant magnetoresistance based gyroscope according to the subject invention;

FIG. 1C is a top view of a third embodiment of the giant magnetoresistance based gyroscope according to the subject invention;

DETAILED DESCRIPTION OF THE INVENTION

Figure 2B:
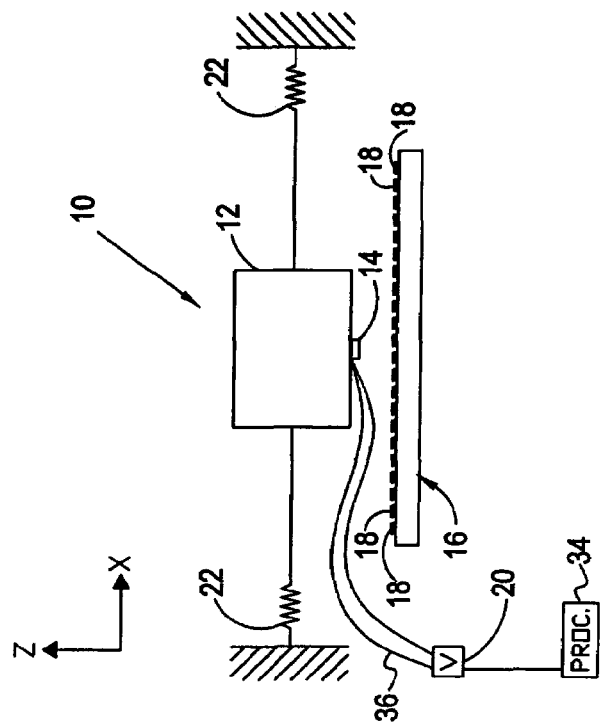
FIG. 2B is a side view of the first embodiment of the giant magnetoresistance based gyroscope, including a voltage sensor and a processor.

Referring to the Figures, wherein like numerals indicate like or corresponding parts throughout the several views, a gyroscope for determining rate of rotation is shown at 10.

In each of several embodiments, the gyroscope 10 includes a mass 12 that oscillates back and forth along an X-axis. When the gyroscope 10 is rotated about a Z-axis, which is perpendicular to the X-axis, the oscillations are impacted by a Coriolis force. The Coriolis force causes the mass 12 to also oscillate along a Y-axis. The Y-axis is perpendicular to the X-axis and the Z-axis.

The gyroscope 10 also includes a giant magnetoresistor (GMR) 14 operatively connected to the mass 12. Those skilled in the art appreciate that that the GMR 14 is also commonly referred to as a spin valve sensor. One typical configuration of the GMR 14 includes a layer of a non-metallic element, such as chromium or copper, sandwiched between layers of magnetic elements, such as iron or cobalt. This results in magnetization of the magnetic elements pointing in opposite directions. Due to this phenomenon, the GMR 14 exhibits a change in electrical resistance when exposed to a magnetic field. Those skilled in the art also realize that other configurations of the GMR 14 can also be fashioned to achieve the change in electrical resistance during exposure to the magnetic field.

The gyroscope 10 further includes a magnetic element 16 disposed proximate to the GMR 14. The magnetic element 16 produces a magnetic field. As described above, the GMR 14 changes in electrical resistance due to changes in the magnetic field produced by the magnetic element 16.

The gyroscope 10 additionally includes a voltage sensor 20 for sensing a voltage across the GMR 14. The voltage sensor 20 is connected to the GMR 14 by electrical lead wires. The voltage sensor 20 applies a supply voltage to the GMR 14 and senses a return voltage from the GMR 14. The return voltage changes as the electrical resistance of the GMR 14 changes. The voltage sensor 20 produces digital signals as the GMR 14 changes in resistance.

Preferably, the gyroscope 10 includes a processor 34 operatively connected to the voltage sensor 20. The processor 34 uses a software algorithm to compute the rate of rotation based on the digital signals produced by said voltage sensor 20.

Figure 2A:
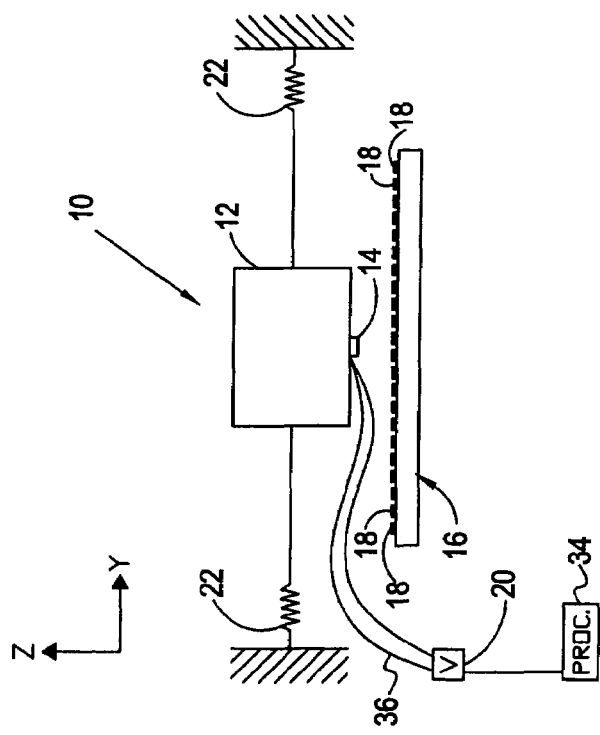
Figure 3:
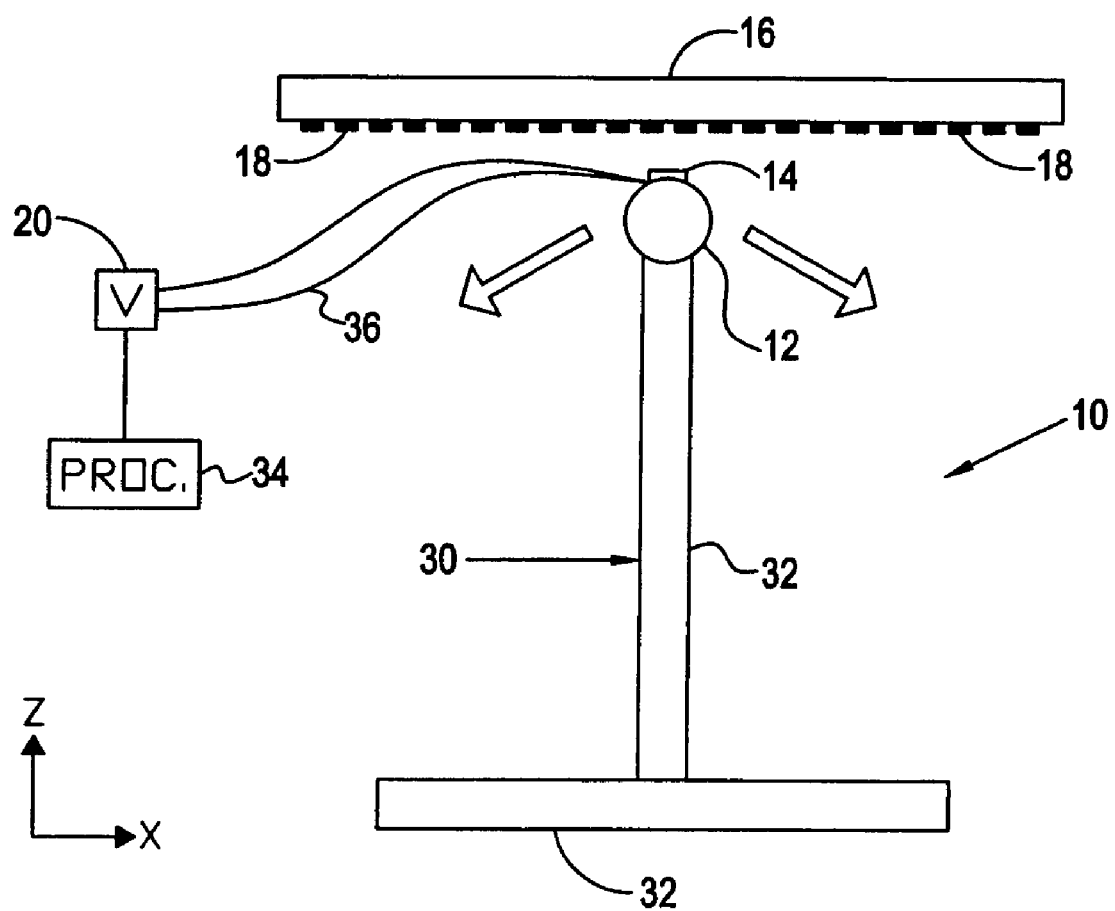
FIG. 3 is a side view of a fourth embodiment of the giant magnetoresistance based gyroscope according to the subject invention.

In a first embodiment, as shown in FIGS. 1A and 2A, the magnetic element 16 includes a strip of magnetic bits 18 to provide discrete magnetic field regions disposed linearly relative to one another along a path. The linear path of the strip of magnetic bits 18 corresponds to the Y-axis. While the gyroscope 10 is not being rotated about the Z-axis, the mass 12 oscillates along the X-axis, but not significantly along the Y-axis. The GMR 14 traverses a very small number (i.e. one or two) of magnetic bits 18 during each oscillation. When the gyroscope 10 is rotated about Z-axis, the Coriolis Force causes the mass 12 to also oscillate along the Y-axis. This results in the GMR 14 traversing a greater number of magnetic bits 18 during each oscillation. The voltage sensor 20 produces digital signals from the GMR 14 traversing the magnetic bits 18. The processor 34 then calculates the rate of rotation based on the change in digital signals.

A second embodiment, as shown in FIGS. 1B and 2B, differs from the first embodiment in that the linear path of the strip of magnetic bits 18 corresponds to the X-axis, instead of the Y-axis. Therefore, when the gyroscope 10 is not being rotated about the Z-axis, the GMR 14 traverses a certain number of magnetic bits 18 during each oscillation. When the gyroscope 10 is rotated about the Z-axis, the Coriolis Force causes the mass 12 to also oscillate along the Y-axis. When this occurs, the GMR 14 will traverse less magnetic bits 18 than the certain number, causing less digital signals to be produced by the voltage sensor 20. The processor 34 then calculates the rate of rotation of the gyroscope 10 based on the change in the number of digital signals.

Referring now to FIG. 1C, a third embodiment is a combination of the first embodiment and the second embodiment. The third embodiment includes a first strip of magnetic bits 18 of a first type corresponding to the X-axis and a second strip of magnetic bits 18 of a second type corresponding to the Y-axis. The different types of magnetic bits 18 cause the voltage sensor 20 to generate different digital signals. With the different digital signals, the processor 34 calculates the rate of rotation of the gyroscope 10. The ratio of signals of the first type to signals of the second type is used in calculation of the rate of rotation. Additionally, specific patterns of digital signals may be developed that correspond to a certain rates of rotation. The processor 34 may compare these specific patterns to predetermined patterns to determine the rate of rotation.

In the first, second, and third embodiments, the mass 12 and the strip of magnetic bits 18 are supported for movement relative to one another. The mass 12 is supported by a plurality of biasing members 22. Preferably, the biasing member 22 is a spring 22. However, other means of supporting the mass 12, such as cantilevers and membranes, may be implemented. In these embodiments, the gyroscope 10 employs a drive circuit 24 for oscillating the mass 12.

In a fourth embodiment, the gyroscope 10 includes a tuning fork 30. The tuning fork 30 comprises a base 32 supporting a stem 34. The mass 12 is supported by the stem 34 and normally oscillates back-and-forth along the X-axis. When the base 32 is rotated along the Z-axis, the mass 12 is deflected to also oscillate along the Y-axis. Again, the X-axis is perpendicular to the Y-axis, and both the X-axis and Y-axis are perpendicular to the Z-axis. The strip of magnetic bits 18 may be located along the X-axis or along the Y-axis. Alternatively, the strip of magnetic bits 18 may be located along both the X-axis and the Y-axis.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A gyroscope (10) for determining rate of rotation, said gyroscope (10) comprising:
   a mass (12) that oscillates with oscillations that vary as said gyroscope (10) is rotated;
   a magnetic element (16) producing a magnetic field;
   a giant magnetoresistor (GMR) (14) operatively connected to said mass (12) for changing in electrical resistance in response to changes in the magnetic field produced by said magnetic element (16);
   a voltage sensor (20) operatively connected to said GMR (14) for sensing a voltage across said GMR (14);
   said magnetic element (16) including a strip of magnetic bits (18) providing discrete magnetic regions disposed linearly relative to one another along a path;
   said mass (12) and said strip of magnetic bits (18) being supported for movement relative to one another along said path to produce digital signals from said voltage sensor (20).

2. A gyroscope (10) as set forth in claim 1 further comprising a drive circuit (24) for vibrating said mass.

3. A gyroscope (10) as set forth in claim 1 further comprising a tuning fork (30) for supporting said GMR (14).

4. A gyroscope (10) as set forth in claim 1 further comprising a processor (34) operatively connected to said voltage sensor (20) for computing the rate of rotation based on said digital signals produced by said voltage sensor (20).

5. A gyroscope (10) as set forth in claim 1 further comprising a plurality of biasing members (22) for supporting said mass (12).

6. A gyroscope (10) as set forth in claim 5 wherein said plurality of biasing members (22) is comprised of a plurality of springs (22).

7. A gyroscope (10) for determining rate of rotation comprising:
   a mass (12) that oscillates with oscillations that vary as said gyroscope (10) is rotated;
   a magnetic element (16) producing a magnetic field;
   a giant magnetoresistor (GMR) (14) operatively connected to said mass (12) for changing in electrical resistance in response to changes in the magnetic field produced by said magnetic element (16);
   a voltage sensor (20) operatively connected to said GMR (14) for sensing the voltage across said GMR (14);
   said magnetic element (16) including a first strip of magnetic bits (18) providing discrete magnetic regions disposed linearly relative to one another along a first path and a second strip of magnetic bits (18) providing discrete magnetic regions disposed linearly relative to one another along a second path; and
   said mass (12) and said strips of magnetic bits (18) being supported for movement relative to one another along said paths to produce digital signals from said voltage sensor (20).

8. A gyroscope (10) as set forth in claim 7 further comprising a drive circuit (24) for oscillating said mass (12).

9. A gyroscope (10) as set forth in claim 7 further comprising a tuning fork (30) for supporting said GMR (14).

10. A gyroscope (10) as set forth in claim 7 further comprising a processor (34) operatively connected to said voltage sensor (20) for computing the rate of rotation based on said digital signals produced by said voltage sensor (20).

11. A gyroscope (10) as set forth in claim 7 further comprising a plurality of biasing members (22) for supporting said mass (12).

12. A gyroscope (10) as set forth in claim 11 wherein said plurality of biasing members (22) is comprised of a plurality of springs (22).

* * * * *